(12) United States Patent
Huebner et al.

(10) Patent No.: US 7,140,426 B2
(45) Date of Patent: Nov. 28, 2006

(54) RADIANT PANEL

(75) Inventors: Fritz Huebner, Holland, MI (US); Kelly Van Koevering, Zeeland, MI (US)

(73) Assignee: Plascore, Inc., Zeeland, MI (US)

( * ) Notice: Subject to any disclaimer, the term of this patent is extended or adjusted under 35 U.S.C. 154(b) by 214 days.

(21) Appl. No.: 10/651,474

(22) Filed: Aug. 29, 2003

(65) Prior Publication Data

US 2005/0045317 A1 Mar. 3, 2005

(51) Int. Cl.
*F28F 3/14* (2006.01)
(52) U.S. Cl. .................................. 165/170; 165/53
(58) Field of Classification Search ............... 165/168, 165/170, 135, 169, 53, 54
See application file for complete search history.

(56) References Cited

U.S. PATENT DOCUMENTS

| | | | |
|---|---|---|---|
| 1,800,150 A * | 4/1931 | Musgrave et al. ............ 165/56 |
| 1,833,291 A * | 11/1931 | Kraenzlein et al. ......... 165/128 |
| 3,120,869 A * | 2/1964 | Carpenter ................... 165/171 |
| 3,265,121 A | 8/1966 | Hickman |
| 3,269,459 A * | 8/1966 | Popovitch ................... 165/140 |
| 3,514,834 A | 6/1970 | Beck, Jr. |
| 3,698,475 A | 10/1972 | Beck, Jr. |
| 3,703,758 A | 11/1972 | Beck, Jr. |
| 3,776,538 A | 12/1973 | Beck, Jr. |
| 3,973,103 A | 8/1976 | Tadewald |
| 4,074,406 A | 2/1978 | Boyd et al. |
| 4,080,703 A | 3/1978 | Beck, Jr. |
| 4,083,093 A | 4/1978 | Chertok |
| 4,122,830 A * | 10/1978 | Hapgood ..................... 165/171 |
| 4,209,059 A | 6/1980 | Anthony et al. |
| 4,301,859 A | 11/1981 | Hollemann |
| 4,635,710 A | 1/1987 | Shelley |
| 4,766,951 A | 8/1988 | Bergh |
| 5,261,251 A | 11/1993 | Galiyano |
| 5,363,908 A | 11/1994 | Koster |
| 5,495,724 A | 3/1996 | Koster |
| 5,666,820 A | 9/1997 | Homm et al. |
| 5,740,649 A | 4/1998 | Fuchs et al. |
| 5,799,723 A | 9/1998 | Sokolean |
| 5,930,962 A | 8/1999 | Sokolean |
| 5,957,378 A | 9/1999 | Fiedrich |
| 5,964,284 A * | 10/1999 | Ikejima et al. ............... 165/171 |
| 5,996,354 A | 12/1999 | Sokolean et al. |
| 6,073,407 A | 6/2000 | Sokolean |
| 6,152,377 A | 11/2000 | Fiedrich |
| 6,220,523 B1 | 4/2001 | Fiedrich |

(Continued)

FOREIGN PATENT DOCUMENTS

DE 1923137 9/1965

(Continued)

OTHER PUBLICATIONS

Krantz Technology GmbH, "Cooling and Heating Systems, 2.1 SKS-4/1 static cooling ceiling system," web site catalog excerpt, www.krantz.de (2003).

(Continued)

*Primary Examiner*—Teresa J. Walberg
(74) *Attorney, Agent, or Firm*—Price, Heneveld, Cooper, DeWitt & Litton, LLP (57) ABSTRACT

A radiant panel includes a first skin and a fluid conduit. The first skin includes an inner face and an outer face and the fluid conduit is formed in multiple rows with at least a portion of the fluid conduit bonded to the inner face of the first skin. The fluid conduit of each of the rows has a serpentine configuration that provides structural support for the first skin.

47 Claims, 6 Drawing Sheets

U.S. PATENT DOCUMENTS

| | | |
|---|---|---|
| 6,263,690 B1 | 7/2001 | Sokolean et al. |
| 6,330,980 B1 | 12/2001 | Fiedrich |

FOREIGN PATENT DOCUMENTS

| | | |
|---|---|---|
| DE | 1978367 | 2/1968 |
| DE | 2759770 | 2/1981 |
| DE | 3015961 | 11/1981 |
| DE | 3032968 | 3/1982 |
| DE | 3500880 | 8/1985 |
| DE | 4201553 | 11/1992 |
| DE | 4132870 | 4/1993 |
| DE | 4400562 | 9/1994 |
| EP | 0278489 | 8/1988 |
| EP | 0568523 | 11/1993 |
| EP | 0769659 | 4/1997 |
| EP | 0772006 | 5/1997 |
| EP | 0786570 | 7/1997 |
| EP | 0859097 | 8/1998 |
| FR | 2618212 | 1/1989 |
| GB | 2298914 | 9/1996 |
| GB | 2397642 | 7/2004 |

OTHER PUBLICATIONS

Krantz Technology GmbH, "Cooling and Heating Systems, 2.2 SKS-5/1 static cooling ceiling system," web site catalog excerpt, www.krantz.de (2003).

Krantz Technology GmbH, "Cooling and Heating Systems, 3.1 Contact cooling ceiling system KKS-1 for metal ceilings," web site catalog excerpt, www.krantz.de (2003).

Krantz Technology GmbH, "Cooling and Heating Systems, 3.2 Contact cooling ceiling system KKS-2 for gypsum plasterboard ceilings," web site catalog excerpt, www. krantz.de (2003).

* cited by examiner

RADIANT PANEL

BACKGROUND OF THE INVENTION

The present invention is generally directed to a radiant panel and, more specifically, to a radiant panel that can be used for heating and/or cooling a building.

A number of U.S. patents disclose radiant panels that may be implemented within a building. For example, U.S. Pat. No. 4,635,710 discloses a radiant panel that includes an extruded aluminum plate member that has a saddle adapted to receive and retain a copper tube having fluid circulating therein. The extruded plate members have channels on each side of the saddle to receive a fastener and connect the plates to a supporting grid structure in a room.

U.S. Pat. No. 4,083,093 discloses a solar panel that is made of different interior and exterior materials to utilize the structural and heat absorbing properties of the exterior material and a corrosion resistant property of the interior material. The exterior material is formed by extrusion to have diametrically extending fins, one of which terminates in a socket so that a plurality of such panels can be readily assembled in edge-to-edge relation.

U.S. Pat. No. 4,080,703 discloses a heat exchanger that takes the form of a heat radiating absorbing panel that includes an aluminum panel having a copper tube attached thereto in a heat exchange relationship. The panel has at least one pair of parallel spaced retainer legs, which have angularly inwardly extending flanges. A copper tube of circular cross-section is laid into the channel formed by the retainer legs and then is squashed by a die into a generally oval cross-section so as to be confined within the retainer legs.

U.S. Pat. No. 3,973,103 discloses a wood veneer radiant heating panel that incorporates an internal layer of semiconductive carbonaceous pyropolymer, consisting of carbon and hydrogen on a high surface area refractory inorganic oxide support, to provide electrical resistance radiant heating. U.S. Pat. Nos. 3,776,538; 3,703,758; 3,698,475; and 3,514,834 disclose a method and apparatus for securing an elongated member, e.g., a metallic tubing, to a flat sheet of metal.

U.S. Pat. No. 5,957,368 discloses a hydronic heating system that includes a thermally conductive plate mounted in a floor or wall that includes tubing that is maintained in relationship with a subfloor by heat transfer plates. U.S. Pat. No. 5,740,649 discloses a false ceiling for buildings that is designed to absorb acoustic waves and has perforated plates.

U.S. Pat. No. 6,073,407 discloses a plurality of panels that include a central longitudinal groove for receiving a pipe. U.S. Pat. No. 5,930,962 discloses a panel and a tube, which is attached to a plate, with a variety of differently formed guides and/or guide webs. U.S. Pat. No. 5,799,723 discloses a ceiling element for a heating and cooling ceiling that has a guide for holding a conduit, through which a heat transfer medium flows, and a contact surface for making contact with the ceiling panel. U.S. Pat. No. 5,666,820 discloses a cooling ceiling pipe support apparatus for air conditioning a room with a system of cooling pipes. The apparatus includes a hole in the element connected to the ceiling of the building and a plurality of connecting elements, which accommodates a respectively assigned region of one of heating cooling pipes.

U.S. Pat. No. 5,495,724 discloses a cooling system, which can be fastened to a ceiling with a suspension provided beneath the ceiling, disposed above a space to be cooled and with cooling pipes between the ceiling and the suspension. The space to be cooled and the space between the ceiling and the suspension are connected through air current paths.

U.S. Pat. No. 5,363,908 discloses a heating and cooling arrangement that is suspended from a room ceiling. U.S. Pat. No. 4,766,951 discloses a radiant panel, which has an external panel shell, which can be used as a passive panel, and an extruded aluminum radiator panel resting in the shell, with an outward side in contact with the shell and an inward side in contact with a copper tube, which acts as a fluid conduit. U.S. Pat. No. 4,074,406 discloses a solar energy collector that includes a thin sheet of copper laminated to a layer of insulating foam, which in turn is laminated to a backing plate of pressed wood. A soft copper tube is pressed against a laminated assembly and the copper tube and the sheet are bonded together to produce a collector panel. U.S. Pat. No. 4,209,059 discloses an aluminum clad radiator core with a brazing alloy joining a tube to the core.

U.S. Pat. No. 6,263,690 discloses a cooling element that is supported by a floor stand that is readily detachable from a floor such that the cooling element is capable of being relocated to different locations. U.S. Pat. No. 5,261,251 discloses a cooling and heating system for a building. U.S. Pat. No. 5,996,354 discloses a cooling element that is fitted into a ceiling region. U.S. Pat. No. 6,330,980 discloses a heating element that includes a radiant metal plate that is in contact with a link of tubing that conducts water. U.S. Pat. No. 6,152,377 also discloses a radiant floor for a wall hydronic heating system that includes a tube attached to a radiant plate.

While the above-described cooling/heating panels/systems function, depending upon the application, the above-described panels can be quite expensive and difficult to implement in numerous applications as the weight of a given panel may be relatively heavy in order to meet the rigidity requirements of certain applications. What is needed is a radiant panel that is relatively inexpensive, lightweight and that maintains rigidity in a number of different applications, such as wall, ceiling and floor panels.

SUMMARY OF THE INVENTION

According to one embodiment of the present invention, a radiant panel includes a first skin, including an outer face and an inner face, and a fluid conduit formed in multiple rows with at least a portion of the fluid conduit bonded to the inner face of the first skin. In this embodiment, each of the rows of the fluid conduit has a serpentine configuration to provide structural support for the first skin.

According to another embodiment of the present invention, a radiant panel includes a first skin, a second skin and a fluid conduit formed in multiple rows positioned between the first and second skins. The first skin includes an outer face and an inner face and the second skin also includes an outer face and an inner face. In this embodiment, a first portion of the fluid conduit is bonded to the inner face of the first skin and a second portion of the fluid conduit is bonded to the inner face of the second skin.

According to yet another embodiment of the present invention, a radiant panel includes a first skin, a fluid conduit, a second skin and a core material. In this embodiment, the first and second skins each include an outer face and an inner face and the fluid conduit is formed in multiple rows, with at least a portion of the fluid conduit being adjacent to the inner face of the first skin. The core material is positioned between the first and second skins and the fluid conduit is positioned between the core material and the first skin.

According to still another embodiment of the present invention, a radiant panel includes a first skin, a second skin, a fluid conduit and a core material. The first and second skins each include an outer face and an inner face and the fluid conduit is formed in multiple rows. A portion of the fluid conduit is adjacent to the inner face of the first skin and a second portion of the fluid conduit is adjacent to the inner face of the second skin. The core material is positioned between the inner face of the first and second skins and a portion of the core material is positioned between the rows of the fluid conduit.

These and other features, advantages and objects of the present invention will be further understood and appreciated by those skilled in the art by reference to the following specification, claims and appended drawings.

DETAILED DESCRIPTION OF PREFERRED EMBODIMENTS

A number of radiant panels are described herein, which can generally be fabricated from lightweight thinner materials than prior art radiant panels without sacrificing structural rigidity, thus, allowing for the panels to be used economically in a number of different cooling/heating applications. It should be appreciated that many of the embodiments of the present invention, disclosed herein, may be utilized as ceiling, floor and/or wall panels.

Figure 1:
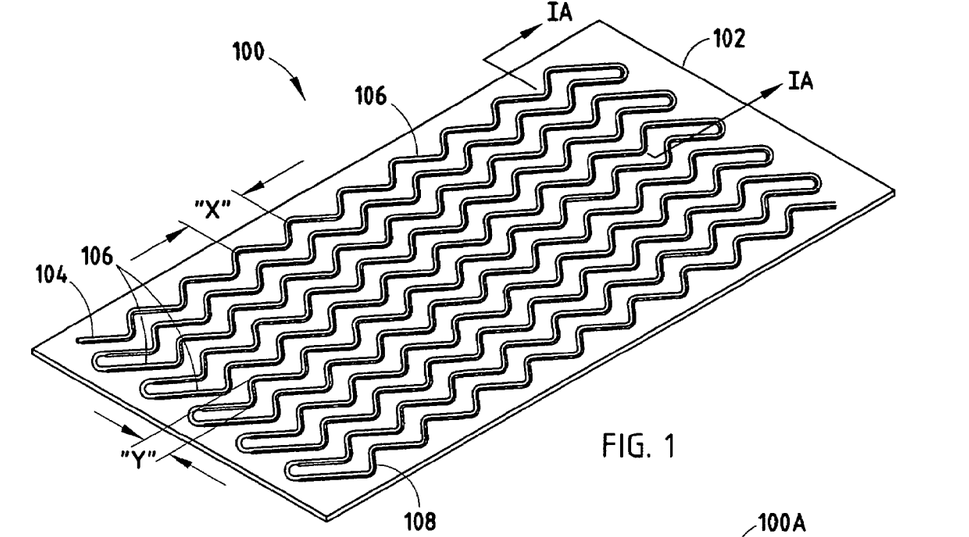
FIG. 1 is a perspective view of a radiant panel, including a first skin and a fluid conduit, according to one embodiment of the present invention.

With reference to FIG. 1, a radiant panel 100 is depicted, which includes a first skin 102, having an outer face and an inner face. A fluid conduit 104, which is formed in multiple rows 106, is positioned on the inner face of the first skin, with at least a portion of the fluid conduit bonded 108 to the inner face of the first skin 102. As is shown in FIG. 1, each row 106 of the fluid conduit 104 has a serpentine configuration that provides structural support, e.g., transverse shear resistance, for the first skin 102. The fluid conduit 104 may be formed of various materials, e.g., copper or stainless steel. According to another embodiment of the present invention, the serpentine configuration of each of the rows 106 traverses the first skin with a length that is about twice a width for each segment. That is, as shown, the 'X' distance is about twice the 'Y' distance, with the 'X' distance defining a segment.

The first skin 102 may be made of a variety of materials, such as a wood, a metal,. a metal with a wood or plastic veneer, a thermally conductive plastic material, a ceramic material, a natural stone material or a glass pane. In any case, the fluid conduit 104 may be bonded 108 to the inner face of the first skin 102 with an adhesive. When the fluid conduit 104 is a metallic tube, e.g., a copper tube, and when the first skin 102 is a sheet metal, the fluid conduit 104 may be bonded 108 to the inner face of the first skin 102 with a nonferrous solder or an adhesive. The fluid conduit 104 may have one of a circular, an elliptical, a square, or a rectangular cross-section, among other cross-sections. In general, panels with a fluid conduit having an elliptical or rectangular cross-section are more rigid and have a thinner profile as more of the fluid conduit is bonded to the skin.

Figure 1A:
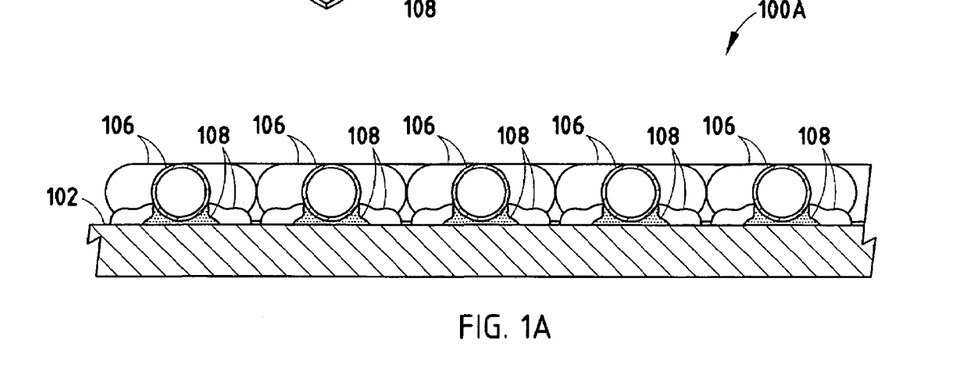
FIG. 1A is a cross-sectional view of a radiant panel along the line IA—IA of FIG. 1, including a first skin and a fluid conduit, according to another embodiment of the present invention.
Figure 1B:
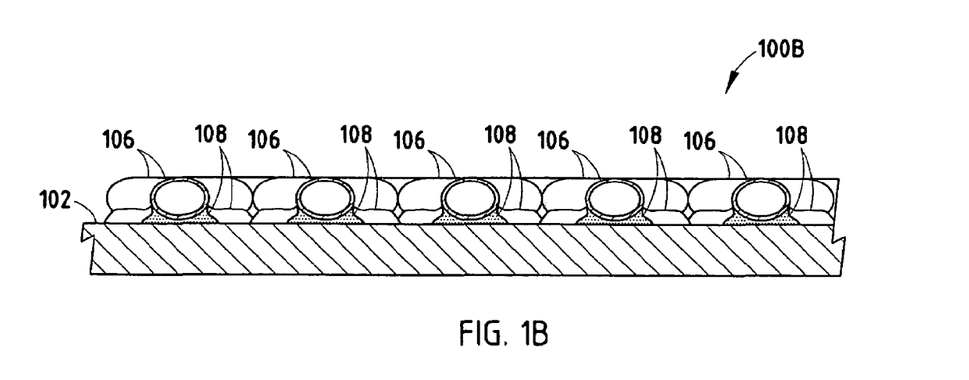
FIG. 1B is a cross-sectional view of a radiant panel, including a first skin and a fluid conduit, according to yet another embodiment of the present invention.

With reference to FIG. 1A, which depicts a cross-section of a radiant panel 100A constructed according to one embodiment of the present invention, the rows 106 and the fluid conduit 104 have a circular cross-section and are bonded 108 to the inner surface of the first skin 102 with an adhesive or, depending upon the type of materials utilized, the bond 108 may be achieved with a nonferrous solder. With reference to FIG. 1B, another radiant panel 100B is depicted in cross-section. The radiant panel 100B of FIG. 1B is essentially the same as the radiant panel 100A of FIG. 1A, with the exception that the rows 106 of the fluid conduit 104 have an elliptical cross-section.

Figure 2:
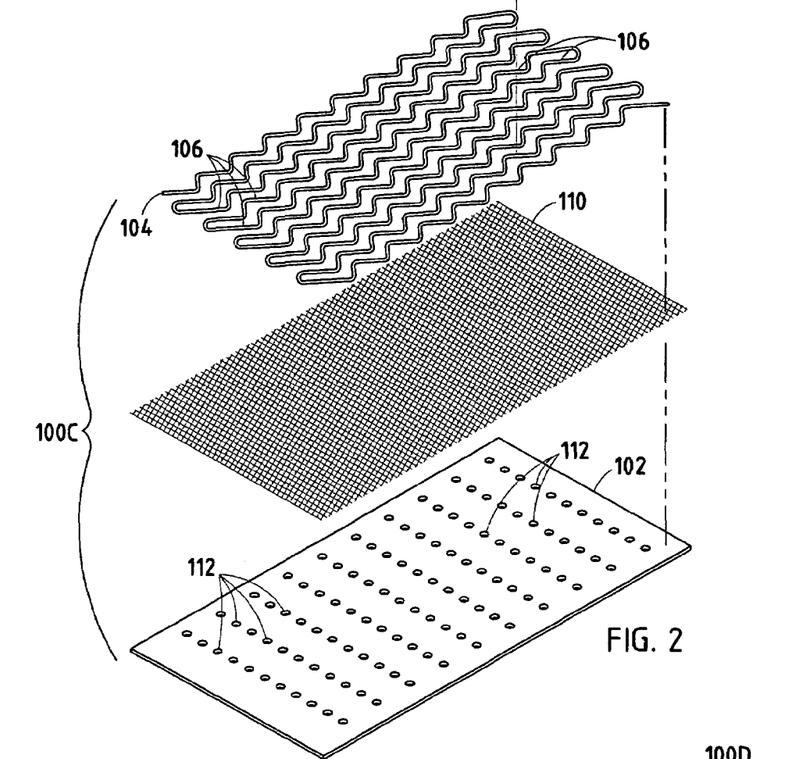
FIG. 2 is an exploded view of a radiant panel, including a first skin, a fluid conduit and a veil with perforations in the first skin, according to yet another embodiment of the present invention.

As is shown in FIG. 2, a radiant panel 100C includes a first skin 102 with a plurality of spaced apertures 112 formed through the first skin 102. The radiant panel 100C also includes a veil 110, which visually screens (with respect to an observer looking through the apertures 112 in the first skin 102 toward the fluid conduit 104) the fluid conduit 104 and may provide sound deadening. A veil may be made of a variety of materials, e.g., a fabric or a non-woven polyester sheet. The use of a veil can be particularly advantageous in rooms with a high level of noise as the radiant panel 100C may also act to reduce the ambient noise level. Alternatively, the apertures 112 may be positioned such that the veil 110 is not required for visual screening.

Figure 2A:
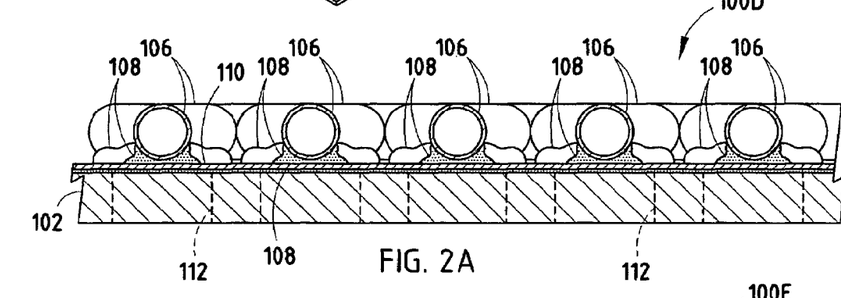
FIG. 2A is a cross-sectional view of a radiant panel, including a perforated first skin, a fluid conduit and a veil with an adhesive on both sides of the veil, according to yet another embodiment of the present invention.
Figure 2B:
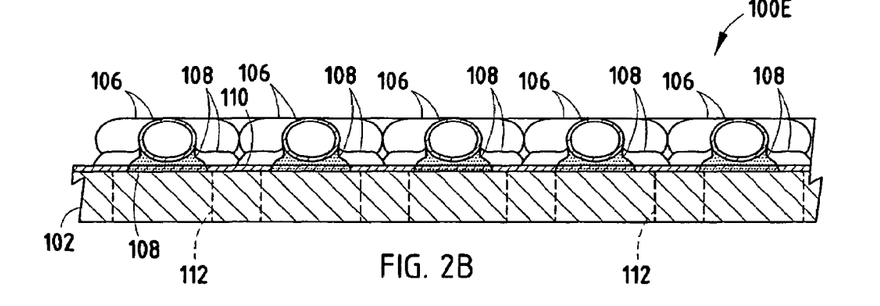
FIG. 2B is a cross-sectional view of a radiant panel, including a first skin, a fluid conduit and a veil with an adhesive extending through the veil, according to still another embodiment of the present invention.

With reference to FIG. 2A, another radiant panel 100D is depicted in cross-section. The radiant panel 100D is similar to the radiant panel 100C of FIG. 2 and depicts a bond 108 formed by an adhesive positioned on opposite sides of the veil 110. That is, the adhesive attaches one side of the veil 110 to the inner face of the first skin 102 and an opposite side of the veil 110 to the fluid conduit 104. With reference to FIG. 2B, a cross-sectional view of yet another radiant panel 100E is depicted. As shown, the radiant panel 100E includes a fluid conduit 104 with an elliptical cross-section. An adhesive that penetrates the veil 110 forms the bond 108 that attaches the fluid conduit 104 to the inner face of the first skin 102.

Figure 3:
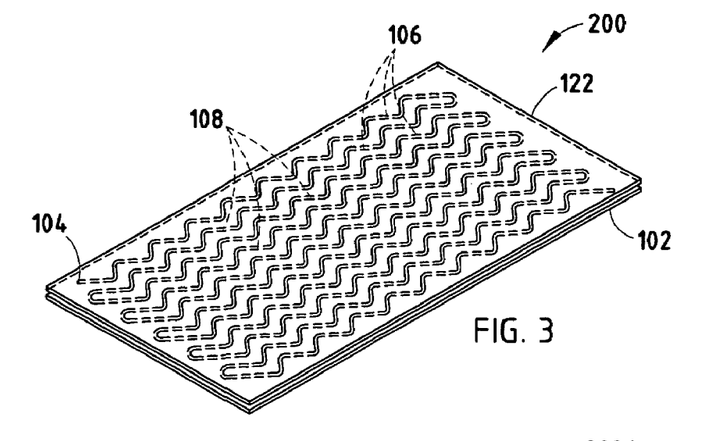
FIG. 3 is a perspective view of a radiant panel, including a fluid conduit positioned between a first skin and a second skin, according to an embodiment of the present invention.

FIG. 3 depicts a perspective view of a radiant panel 200 that includes a second skin 122, in addition to the first skin 102 and the fluid conduit 104. In this embodiment, the fluid conduit 104 is positioned between the first skin 102 and the second skin 122. Each row 106 of the fluid conduit 104 has a serpentine configuration similar to that shown in FIG. 1. Alternatively, each of the rows 106 may be straight if the additional support provided by the serpentine configuration is not required. In either case, a core material, e.g., a honeycomb core, a foam, rockwool or fiberglass, may also be added in desired locations between the first skin 102 and the second skin 122 and in between the rows 106. The filler materials, e.g., foam, rockwool and fiberglass, when implemented, may function to provide increased sound deadening. A first portion of the fluid conduit 104 is bonded to the inner face of the first skin 102 and a second portion of the fluid conduit 104 is bonded to the inner face of the second skin 122.

Suitable honeycomb cores are manufactured and made commercially available by Plascore, Inc. of Zeeland, Mich. (e.g., Part No. 5052). Honeycomb cores have been widely used in the fabrication of lightweight structures used in the aerospace and commercial markets. A honeycomb core is typically sandwiched between skins of aluminum or other high strength composite material to provide a resultant honeycomb core panel. In aerospace applications, aircraft engine nacelles, flaps, overhead bins and galleys are typically constructed from honeycomb core.

Similar to FIG. 1, in at least one embodiment, the serpentine configuration of each of the rows traverses the first skin 102 and the second skin 122 with a length that is about twice a width, for each segment, to provide additional structural integrity to the panel 200. It should be appreciated that the rows 106 of the fluid conduit 104 may also be nested to provide additional structural integrity. The first skin 102 and the second skin 122 may be made of a variety of materials, e.g., a wood, a metal, a metal with a wood or plastic veneer, a thermally conductive plastic material, a ceramic material, a natural stone material or a glass pane, or a combination thereof. In any case, the fluid conduit 104 may be bonded to the inner faces of the first skin 102 and the second skin 122 with an adhesive. Alternatively, when the first skin 102 and the second skin 122 are made of a metallic sheet and the fluid conduit 104 is made of a metal, the fluid conduit 104 may be bonded to the inner faces of the first skin 102 and the second skin 122 with a nonferrous solder.

Figure 3A:
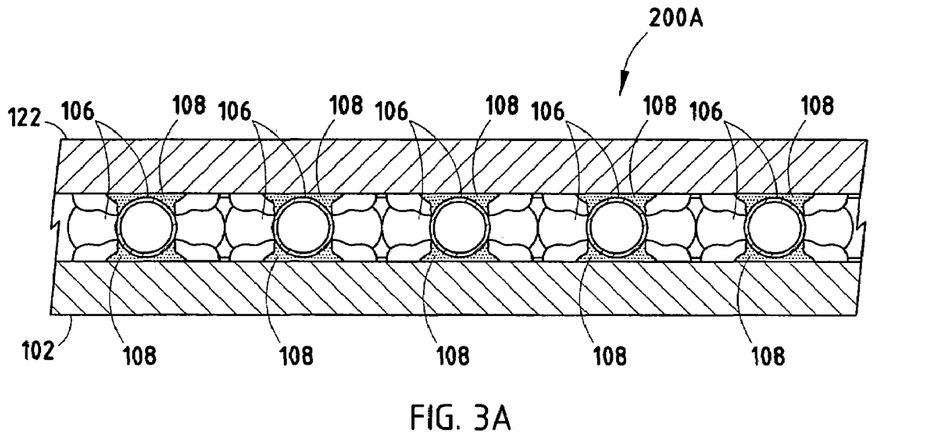
FIG. 3A is a cross-sectional view of a radiant panel, including a fluid conduit positioned between a first and second skin, according to another embodiment of the present invention.
Figure 3B:
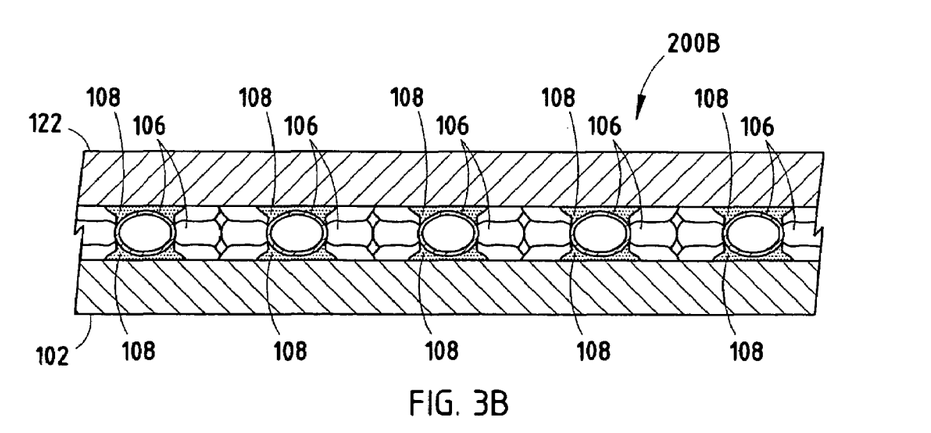
FIG. 3B is a cross-sectional view of a radiant panel, including a fluid conduit positioned between a first and second skin, according to a different embodiment of the present invention.

FIG. 3A shows a cross-sectional view of a radiant panel 200A that includes a first skin 102, a second skin 122 and a fluid conduit 104 having a circular cross-section and formed in a plurality of rows 106 positioned between the first and second skins 102 and 122. A first portion of the fluid conduit 104 is bonded 108 to an inner surface of the first skin 102 and a second portion of the fluid conduit 104 is bonded 108 to an inner surface of the second skin 122. As discussed above, depending upon the materials used for the first and second skins 102 and 122 and the fluid conduit 104, the bond 108 may be achieved with an adhesive or a nonferrous solder. As is shown, each of the rows 106 of the fluid conduit 104 has a serpentine configuration. Alternatively, each of the rows 106 of the fluid conduit 104 may be straight, in applications that do not require additional structural rigidity provided by the serpentine configuration. With reference to FIG. 3B, a radiant panel 200B is essentially the same as the embodiment of FIG. 3A, with the exception that the embodiment of 3B includes a fluid conduit 104 that has an elliptical cross-section. It should be appreciated that other cross-sections, e.g., a rectangular or square cross-section, for the fluid conduit 104 may be desirable in certain applications.

Figure 4:
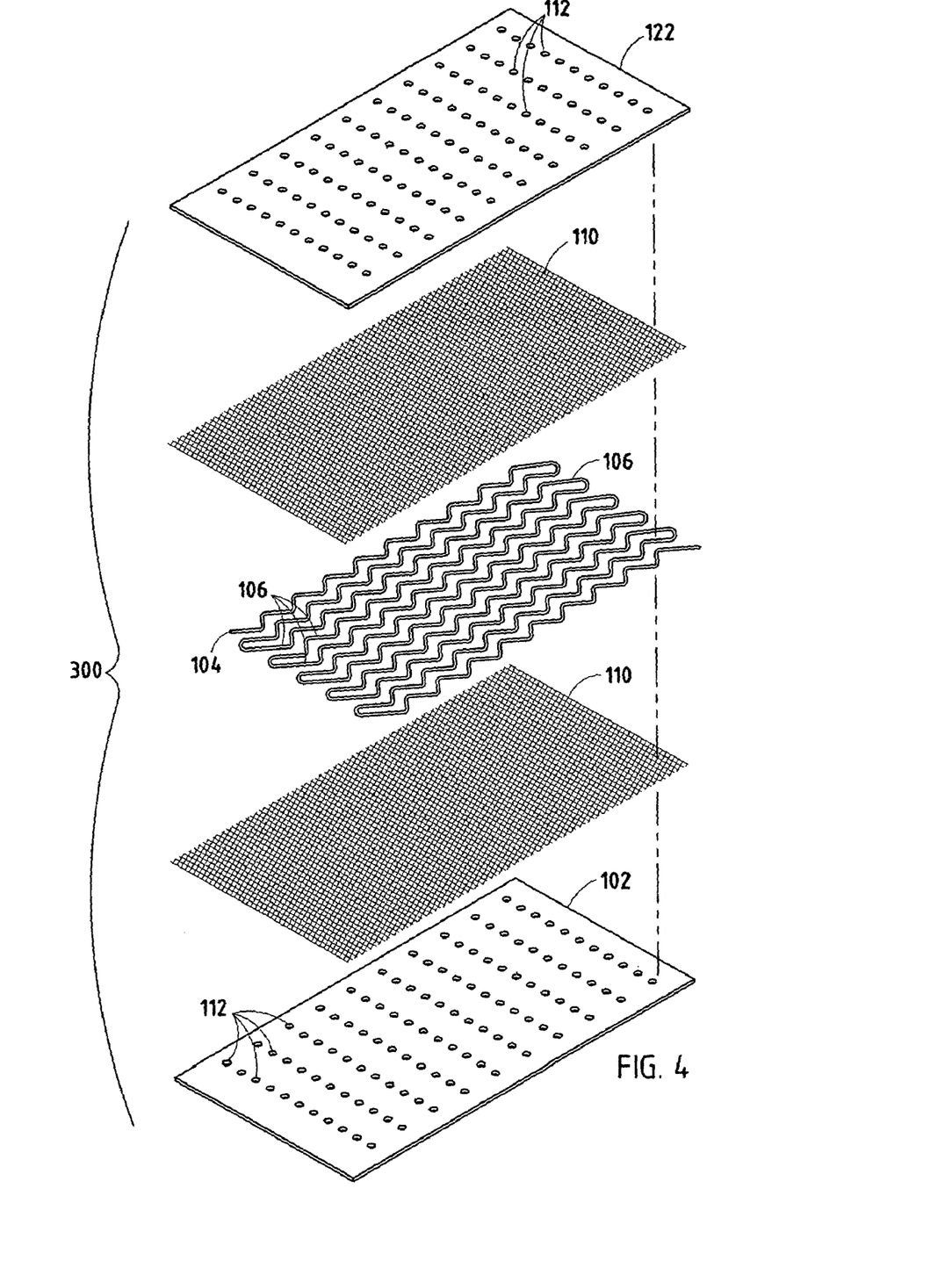
FIG. 4 is an exploded view of a radiant panel, including a fluid conduit positioned between perforated first and second skins and first and second veils.

With reference to FIG. 4, a radiant panel 300 includes a perforated first skin 102, a perforated second skin 122 and a fluid conduit 104, formed in multiple rows 106, positioned between the first skin 102 and the second skin 122. The radiant panel 300 also includes a pair of veils 110. A first veil 110 is positioned between an inner face of the first skin 102 and the fluid conduit 104 and a second veil 110 is positioned between the second skin 122 and the fluid conduit 104. As is discussed above, the veils 110 visually screen the fluid conduit 104 and may provide sound deadening. Alternatively, when the perforations are positioned between the rows 106, the veils 110 may not be required for visual screening. Additionally, the perforations in the skins 102 and 122 may be of different sizes and/or non-existent in at least one of the skins 102 and 122. In either case, a core material, e.g., a honeycomb core, a foam, rockwool or fiberglass, may also be added in desired locations between the first skin 102 and the second skin 122 and in between the rows 106 to achieve a desired function. As is discussed further below, a first portion of the fluid conduit 104 is bonded to an inner face of the first skin 102 and a second portion of the fluid conduit is bonded to an inner face of the second skin 122.

Figure 4A:
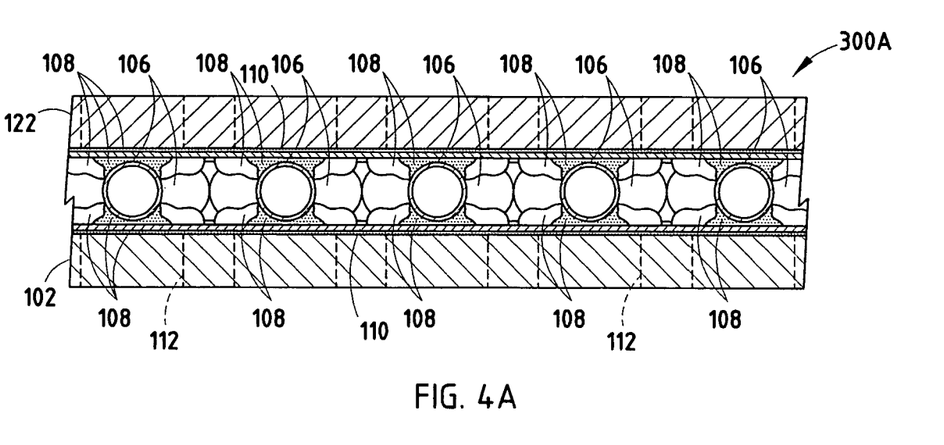
FIG. 4A is a cross-sectional view of a radiant panel, including perforated first and second skins, with first and second veils positioned to obscure the view of the fluid conduit positioned between the first and second skins, according to one embodiment.
Figure 4B:
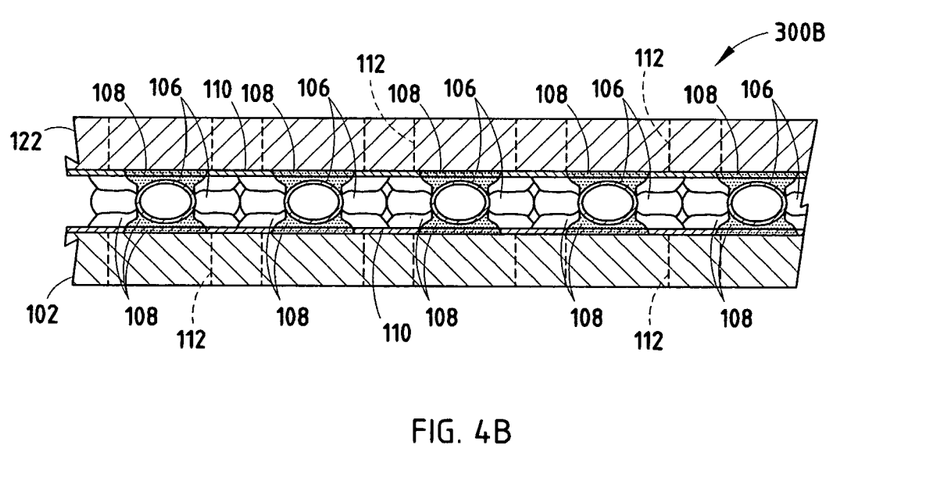
FIG. 4B is a cross-sectional view of a radiant panel, including perforated first and second skins, with first and second veils positioned to obscure the view of the fluid conduit positioned between the first and second skins, according to another embodiment.

FIG. 4A depicts a radiant panel 300B in cross-section where bonds 108 are formed by an adhesive that is placed on both sides of the veils 110. That is, the adhesive 108 does not extend through the veils 110. FIG. 4B depicts a cross-sectional view of a radiant panel 300A, where the bonds 108 are formed by an adhesive that extends through the veils 110.

Figure 5A:
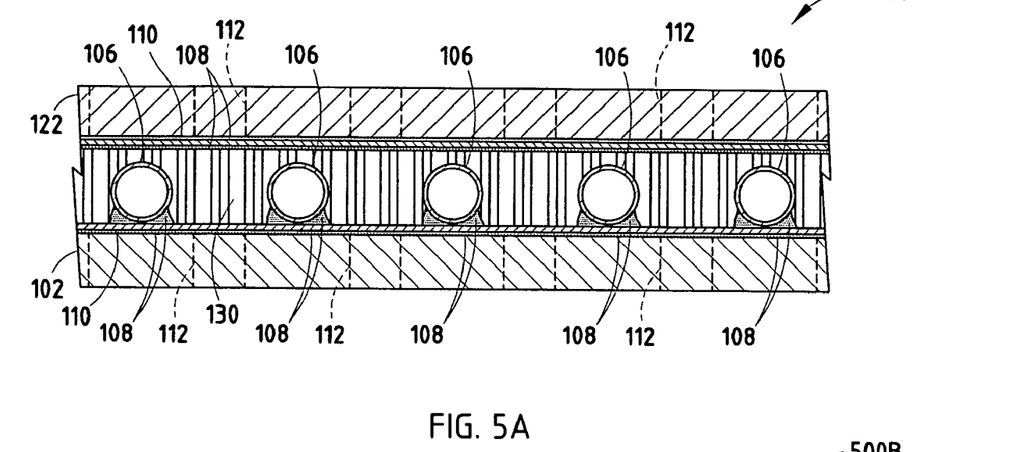
FIG. 5A is a cross-sectional view of a portion of a radiant panel, including perforated first and second skins, between which are positioned a fluid conduit and a core material, according to an embodiment of the present invention.

With reference to FIG. 5A, a radiant panel 500A, according to another embodiment of the present invention, is depicted. Similar to the panels previously described, a cross-sectional view of panel 500A shows multiple rows 106 of a fluid conduit positioned between a first skin 102 and a second skin 122. However, in this embodiment, the rows 106 are generally not formed in a serpentine configuration as a honeycomb core, which is positioned between the first skin 102 and the second skin 122, may be implemented to provide structural support for the radiant panel 500A. Alternatively, the honeycomb core may be replaced with a foam, rockwool or fiberglass (for sound deadening) in applications that do not require additional structural support.

The first skin 102 includes an inner face and an outer face and the second skin 122 includes an inner face and an outer face. The fluid conduit is formed in multiple rows 106 with at least a portion of the fluid conduit being adjacent to the inner face of the first skin 102. The core material 130, for example, an aluminum honeycomb core, is positioned between the first skin 102 and the second skin 122 and the fluid conduit 104 is positioned between the core material 130 and the first skin 102. The core material 130 may be positioned, removed or deformed to receive the fluid conduit 104. As described above, the first skin 102 and the second skin 122 may also be made of at least one of a wood, a metal, a metal with a wood or plastic veneer, a thermally conductive plastic, a ceramic material, a natural stone material and a glass pane.

Figure 5B:
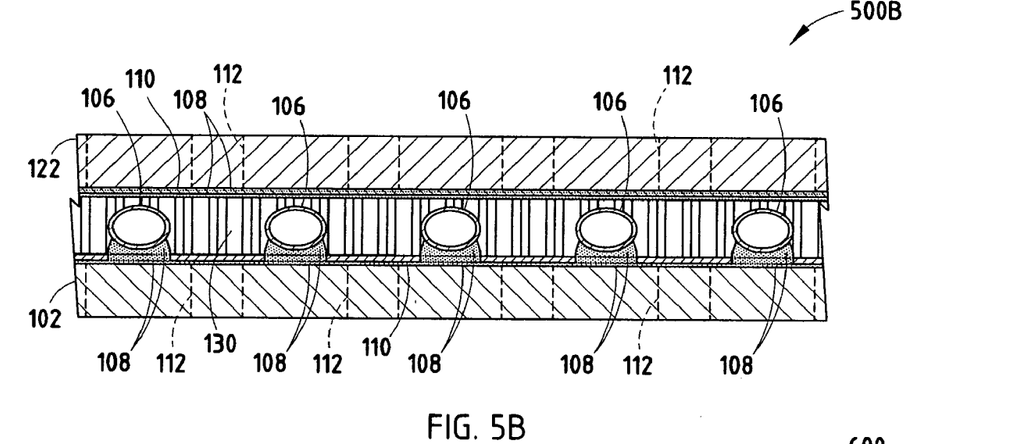
FIG. 5B is a cross-sectional view of a radiant panel, including perforated first and second skins, between which is positioned a core material and a fluid conduit, according to another embodiment of the present invention.

As is also shown in FIG. 5A, the first skin 102 and the second skin 122 include a plurality of apertures 112 formed therethrough. A pair of veils 110 are utilized to visually conceal the core material 130 and the fluid conduit 104, as would be seen through the apertures 112 in the first and second skins 102 and 122. When the core material 130 is a honeycomb core, an adhesive bonds 108 the honeycomb core to the top veil 110 and the top veil 110 to the top skin 122 and the fluid conduit 104 to the bottom veil 110 and the bottom veil 110 to the first skin 102. That is, an adhesive applied to opposite sides of the top and bottom veils 110 provides the bond 108. FIG. 5B depicts a radiant panel 500B in cross-section, which is essentially the same as the radiant panel 500A of FIG. 5A, with the exception that the adhesive extends through the veils 110 to achieve the bond 108.

Figure 6:
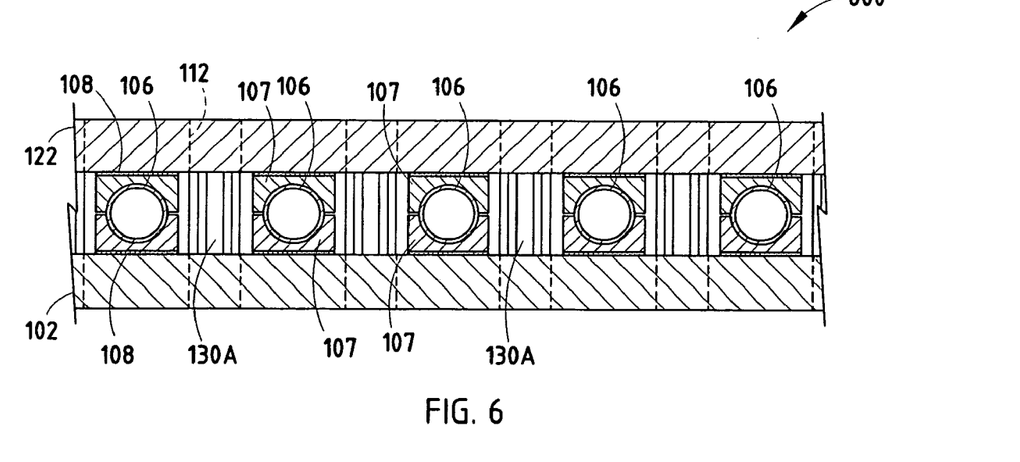
FIG. 6 is a cross-sectional view of a radiant panel according to another embodiment of the present invention.

FIG. 6 depicts a cross-section of a radiant panel 600, constructed according to another embodiment of the present invention. As shown, multiple rows 106 of a fluid conduit are positioned between a first skin 102 and a second skin 122. In this embodiment, the rows 106 may generally be straight, as opposed to being formed in a serpentine configuration. A core material 130, shown positioned between the first skin 102 and the second skin 122, provides structural support and/or sound deadening for the radiant panel 600. When the material 130 is to provide structural support, the material 130 may be an aluminum or plastic honeycomb core. When additional structural support is not required, the material 130 may be filler material, such as a foam, rockwool or fiberglass, which tend to perform additional sound deadening.

The first skin 102 includes an inner face and an outer face and the second skin 122 includes an inner face and an outer face. The fluid conduit is formed in multiple rows 106 with at least a portion of the fluid conduit being adjacent to the inner face of the first skin 102 and located within a bracket 107. The material 130, for example, an aluminum honeycomb core, is positioned between the first skin 102 and the second skin 122 and the fluid conduit is positioned between the material 130 and the first skin 102. As mentioned above, the first skin 102 and the second skin 122 may also be made of at least one of a wood, a metal, a metal with a wood or plastic veneer, a thermally conductive plastic, a ceramic material, a natural stone material and a glass pane.

As is also shown in FIG. 6, the first skin 102 and the second skin 122 include a plurality of apertures 112 formed therethrough, which may be positioned between the rows 106 of the fluid conduit. A pair of veils (not shown) may also be utilized to visually conceal the material 130 and the fluid conduit as would be seen through the apertures 112 in the first and second skins 102A and 122A. As mentioned above, the rows 106 of fluid conduit are retained in the brackets 107, which are attached, e.g., with an adhesive, to the first and second skins 102 and 122. Instead of being distinct components, the brackets 107 may be integrated with the inner faces of the first and second skins 102 and 122. In either embodiment, the brackets 107 of the opposing skins 102 and 122 may be configured to interlock.

Accordingly, a number of different radiant panels have been described herein, which advantageously provide a relatively rigid panel that is lightweight and economical and that can be utilized in a variety of different applications, for example, wall panels, ceiling panels and floor panels.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A radiant panel, comprising:
a first skin including an outer face and an inner face; and
a fluid conduit formed in multiple rows, wherein at least a portion of the fluid conduit is bonded to the inner face of the first skin, and wherein the fluid conduit of each of the rows has a serpentine configuration that provides structural support for the first skin, and wherein the first skin is made of at least one of a wood, a metal with one of a wood and plastic veneer, a thermally conductive plastic material, a ceramic material, a natural stone material and a glass pane, and wherein the fluid conduit is bonded to the inner face of the first skin with an adhesive.

2. The panel of claim 1, wherein the fluid conduit is one of a copper tube and a stainless steel tube.

3. The panel of claim 1, wherein the serpentine configuration of each segment of the rows traverses a length of about twice a width of the first skin.

4. The panel of claim 1, wherein the fluid conduit is a copper tube that has one of a circular and an elliptical cross-section, and wherein an adhesive bonds the copper tube to the first skin.

5. The panel of claim 1, wherein the fluid conduit is made of a metal, and wherein the fluid conduit is bonded to the inner face of the first skin with a nonferrous solder.

6. A radiant panel, comprising:
a first skin including an outer face and an inner face, wherein the first skin includes a plurality of spaced apertures;
a fluid conduit formed in multiple rows; and
a first veil positioned between the first skin and the fluid conduit, wherein at least a portion of the fluid conduit is bonded to the inner face of the first skin, and wherein the fluid conduit of each of the rows has a serpentine configuration that provides structural support for the first skin.

7. The panel of claim 6, wherein the veil visually screens the fluid conduit and provides sound deadening.

8. The panel of claim 7, wherein the fluid conduit is a copper tube that has one of a circular and an elliptical cross-section, and wherein the first skin is made of sheet metal and an adhesive extends through the veil to bond the copper tube to the first skin.

9. The panel of claim 7, wherein the fluid conduit is a copper tube that has one of a circular and an elliptical cross-section, and wherein the first skin is made of sheet metal and an adhesive applied to both sides of the veil bonds the copper tube to the first skin.

10. A radiant panel, comprising:
a first skin including an outer face and an inner face;
a second skin including an outer face and an inner face; and
a fluid conduit formed in multiple rows positioned between the first and second skins, wherein a first portion of the fluid conduit is bonded to the inner face of the first skin and a second portion of the fluid conduit is bonded to the inner face of the second skin, and wherein the first and second skins are made of at least one of a wood, a metal with one of a wood and plastic veneer, a thermally conductive plastic material, a ceramic material, a natural stone material and a glass pane, and wherein the fluid conduit is bonded to the inner faces of the first and second skins with an adhesive.

11. The panel of claim 10, wherein the fluid conduit is one of a copper tube and a stainless steel tube.

12. The panel of claim 10, wherein each of the rows has a serpentine configuration, and wherein the serpentine configuration of each segment of each of the rows traverses a length that is about twice a width.

13. The panel of claim 10, wherein the fluid conduit is made of a metal, and wherein the fluid conduit is bonded to the inner faces of the first and second skins with a nonferrous solder.

14. The panel of claim 10, wherein the first skin includes a plurality of spaced apertures.

15. The panel of claim 10, wherein the first and second skins include a plurality of spaced apertures.

16. A radiant panel, comprising:
a first skin including an outer face and an inner face;
a second skin including an outer face and an inner face;
a fluid conduit formed in multiple rows positioned between the first and second skins; and
a first veil positioned between the first skin and the fluid conduit, wherein a first portion of the fluid conduit is bonded to the inner face of the first skin and a second portion of the fluid conduit is bonded to the inner face of the second skin, and wherein the first skin includes a plurality of spaced apertures.

17. The panel of claim 16, wherein the veil visually screens the fluid conduit and provides sound deadening.

18. The panel of claim 16, wherein the fluid conduit is a copper tube that has one of a circular and an elliptical cross-section, and wherein the first skin is made of sheet metal and an adhesive extends through the veil to bond the copper tube to the first skin.

19. A radiant panel, comprising:
a first skin including an outer face and an inner face;
a second skin including an outer face and an inner face;
a fluid conduit formed in multiple rows positioned between the first and second skins;
a first veil positioned between the first skin and the fluid conduit; and
a second veil positioned between the second skin and the fluid conduit, wherein a first portion of the fluid conduit is bonded to the inner face of the first skin and a second portion of the fluid conduit is bonded to the inner face of the second skin, and wherein the first and second skins include a plurality of spaced apertures.

20. The panel of claim 19, wherein the veils visually screen the fluid conduit and provide sound deadening.

21. The panel of claim 19, wherein the fluid conduit is a copper tube that has one of a circular and an elliptical cross-section, and wherein the first and second skins are made of sheet metal and an adhesive applied to both sides of the first and second veils bonds the copper tube to the first and second skins.

22. A radiant panel, comprising:
a first skin including an outer face and an inner face;
a fluid conduit formed in multiple rows, wherein at least a portion of the fluid conduit is adjacent to the inner face of the first skin;
a second skin including an outer face and an inner face;
a core material, wherein the core material is positioned between the first and second skins, and wherein the fluid conduit is positioned between the core material and the first skin, and wherein the first and second skins are made of at least one of a wood, a metal with one of a wood and plastic veneer, thermally conductive plastic material, a ceramic material, a natural stone material and a glass pane.

23. The panel of claim 22, wherein the fluid conduit is a copper tube.

24. The panel of claim 22, wherein the first skin includes a plurality of spaced apertures.

25. The panel of claim 22, wherein the first and second skins include a plurality of spaced apertures.

26. The panel of claim 22, wherein the fluid conduit is a copper tube that has one of a circular and an elliptical cross-section, and wherein an adhesive applied to a first side of the core material and a portion of the copper tube facing the inner face of the first skin bonds the copper tube and the core material to the first skin and an adhesive applied to a second side of the core material facing the inner face of the second skin bonds the core material to the second skin.

27. A radiant panel, comprising:
a first skin including an outer face and an inner face;
a fluid conduit formed in multiple rows, wherein at least a portion of the fluid conduit is adjacent to the inner face of the first skin;
a second skin including an outer face and an inner face; and
a core material, wherein the core material is positioned between the first and second skins, and wherein the fluid conduit is positioned between the core material and the first skin, and wherein a portion of the core material is a honeycomb core and the honeycomb core is one of removed and deformed to receive the fluid conduit.

28. A radiant panel, comprising:
a first skin including an outer face and an inner face;
a fluid conduit formed in multiple rows, wherein at least a portion of the fluid conduit is adjacent to the inner face of the first skin;
a second skin including an outer face and an inner face;
a core material; and
a first veil positioned between the inner face of the first skin and the fluid conduit and the inner face of the first skin and the core material, wherein the core material is positioned between the first and second skins, and wherein the fluid conduit is positioned between the core material and the first skin, and wherein the first skin includes a plurality of spaced apertures.

29. The panel of claim 28, wherein the veil visually screens the fluid conduit and the core material and provides sound deadening.

30. The panel of claim 28, wherein the fluid conduit is a copper tube that has one of a circular and an elliptical cross-section and the first and second skins are made of sheet metal, and wherein an adhesive applied to a first side of the core material and a portion of the copper tube facing the inner face of the first skin extends through the first veil to bond the copper tube and the core material to the first skin and an adhesive applied to a second side of the core material facing the inner face of the second skin bonds the core material to the inner face of the second skin.

31. A radiant panel, comprising:
a first skin including an outer face and an inner face;
a fluid conduit formed in multiple rows, wherein at least a portion of the fluid conduit is adjacent to the inner face of the first skin;
a second skin including an outer face and an inner face;
a core material;
a first veil positioned between the inner face of the first skin and the fluid conduit and the inner face of the first skin and the core material; and
a second veil positioned between the core material and the inner face of the second skin, wherein the core material is positioned between the first and second skins, and wherein the fluid conduit is positioned between the core material and the first skins, and wherein the first and second skins include a plurality of spaced apertures.

32. The panel of claim 31, wherein the veils visually screen the fluid conduit and the core material and provide sound deadening.

33. The panel of claim 31, wherein the fluid conduit is a copper tube that has one of a circular and an elliptical cross-section and the first and second skins are made of sheet metal, and wherein an adhesive applied to a first side of the core material and a portion of the copper tube facing the inner face of the first skin extends through the first veil to bond the copper tube and the core material to the inner face of the first skin, and an adhesive applied to a second side of the core material facing the inner face of the second skin extends through the second veil to bond the core material to the inner face of the second skin.

34. A radiant panel, comprising:
a first skin including an outer face and an inner face;
a fluid conduit formed in multiple rows, wherein at least a portion of the fluid conduit is adjacent to the inner face of the first skin;
a second skin including an outer face and an inner face;
a core material, wherein the core material is positioned between the first and second skins, and wherein the fluid conduit is positioned between the core material and the first skin, and wherein the core material is a honeycomb core.

35. A radiant panel, comprising:
a first skin including an outer face and an inner face;
a second skin including an outer face and an inner face;
a fluid conduit formed in multiple rows, wherein a first portion of the fluid conduit is adjacent to the inner face of the first skin and a second portion of fluid conduit is adjacent to the inner face of the second skin; and
a core material positioned between the inner face of the first and second skins, wherein a portion of the core material is positioned between the rows of the fluid conduits.

36. The panel of claim 35, wherein the fluid conduit is a copper tube.

37. The panel of claim 35, wherein the first and second skins are made of at least one of a wood, a metal, a metal with one of a wood and plastic veneer, a thermally conductive plastic material, a ceramic material, a natural stone material and a glass pane.

38. The panel of claim 35, wherein the first skin includes a plurality of spaced apertures.

39. The panel of claim 35, wherein the first and second skins include a plurality of spaced apertures.

40. The panel of claim 35, wherein the fluid conduit is a copper tube that has one of a circular and an elliptical cross-section and the first and second skins are made of sheet metal, and wherein an adhesive applied to a first side of the core material and copper tube facing the inner face of the first skin and a second side of the core material and the copper tube facing the inner face of the second skin bonds the copper tube and the core material to the first and second skins.

41. The panel of claim 35, wherein the core material is a honeycomb core.

42. A radiant panel, comprising:
a first skin including an outer face and an inner face;
a second skin including an outer face and an inner face;
a fluid conduit formed in multiple rows;
a first veil positioned between the inner face of the first skin and the fluid conduit and the inner face of the first skin and the core material, wherein a first portion of the fluid conduit is adjacent to the inner face of the first skin and a second portion of fluid conduit is adjacent to the inner face of the second skin, and wherein the first skin includes a plurality of spaced apertures; and
a core material positioned between the inner face of the first and second skins, wherein a portion of the core material is positioned between the rows of the fluid conduits.

43. The panel of claim 42, wherein the veil visually screens the fluid conduit and the core material and provides sound deadening.

44. The panel of claim 42, wherein the fluid conduit is a copper tube that has one of a circular and an elliptical cross-section and the first and second skins are made of sheet metal, and wherein an adhesive applied to a first side of the core material and the copper tube facing the inner face of the first skin extends through the veil to bond the copper tube and the core material to the first skin and an adhesive applied to a second side of the core material and the copper tube facing the inner face of the second skin bonds the core material and the copper tube to the inner face of the second skin.

45. A radiant panel, comprising:
a first skin including an outer face and an inner face;
a second skin including an outer face and an inner face;
a fluid conduit formed in multiple rows;
a first veil positioned between the inner face of the first skin and the fluid conduit and the inner face of the first skin and the core material;
a second veil positioned between the core material and the inner face of the second skin, wherein a first portion of the fluid conduit is adjacent to the inner face of the first skin and a second portion of fluid conduit is adjacent to the inner face of the second skin, and wherein the first and second skins include a plurality of spaced apertures; and
a core material positioned between the inner face of the first and second skins, wherein a portion of the core material is positioned between the rows of the fluid conduits.

46. The panel of claim 45, wherein the first and second veils visually screen the fluid conduit and the core material and provide sound deadening.

47. The panel of claim 45, wherein the fluid conduit is a copper tube that has one of a circular and an elliptical cross-section and the first and second skin are made of sheet metal, and wherein an adhesive applied to a first side of the core material and the copper tube facing the inner face of the first skin extends through the first veil to bond the copper tube and the core material to the inner face of the first skin and an adhesive applied to a second side of the core material facing the inner face of the second skin extends through the second veil to bond the core material to the inner face of the second skin.

* * * * *